United States Patent
Mitchell et al.

(10) Patent No.: US 6,242,390 B1
(45) Date of Patent: Jun. 5, 2001

(54) CLEANUP ADDITIVE

(75) Inventors: Thomas O. Mitchell, Sugar Land, TX (US); Roger J. Card, Paris (FR); Arthur Gomtsyan, Vernon Hills, IL (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/127,023

(22) Filed: Jul. 31, 1998

(51) Int. Cl.[7] .............................. C09K 3/00; E21B 43/26

(52) U.S. Cl. .................... 507/211; 507/209; 507/269; 507/271; 507/274; 507/277; 507/922; 166/308

(58) Field of Search ..................... 507/209, 211, 507/271, 922, 274, 269, 277; 166/308

(56) References Cited

U.S. PATENT DOCUMENTS

| | | |
|---|---|---|
| 2,601,395 | 6/1952 | Hatch . |
| 3,960,736 | 6/1976 | Free et al. . |
| 4,326,873 | 4/1982 | Reilly et al. . |
| 4,534,870 | 8/1985 | Williams . |
| 4,568,481 * | 2/1986 | Harris, Jr. .............................. 507/209 |
| 4,579,670 | 4/1986 | Payne . |
| 4,604,218 | 8/1986 | Dawson . |
| 4,683,068 | 7/1987 | Kucera . |
| 4,784,694 * | 11/1988 | Lemanczyk et al. ................. 166/308 |
| 4,917,186 | 4/1990 | Mumallah . |
| 4,986,356 | 1/1991 | Lockhart et al. . |
| 5,223,159 | 6/1993 | Smith et al. . |
| 5,224,546 | 7/1993 | Smith et al. . |
| 5,226,481 * | 7/1993 | Le et al. .............................. 166/308 |
| 5,252,234 | 10/1993 | Sharif . |
| 5,252,235 | 10/1993 | Sharif . |
| 5,252,236 | 10/1993 | Sharif . |
| 5,497,830 | 3/1996 | Boles et al. . |
| 5,624,886 | 4/1997 | Dawson et al. . |

FOREIGN PATENT DOCUMENTS

0326720 A1    8/1989   (EP) .

OTHER PUBLICATIONS

A.J. Anderson, P.J.N. Ashton, J. Lang, & M.L. Samuelson, "Production Enhancement Through Aggressive Flowback Procedures in the Codell Formation," SPE 36468, presented at 1996 SPE Anual Technical Conference and Exhib., Denver, Co, Oct. 6–9, 1996.

R.C. Earlougher and W.W. Love, "Sequestering Agents for Prevention of Scale Deposition in Oil Wells," J. Petr. Tech., 17–20 (Apr. 1957).

(List continued on next page.)

Primary Examiner—Philip Tucker
(74) Attorney, Agent, or Firm—Robin C. Nava; Thomas Mitchell; John J. Ryberg

(57) ABSTRACT

According to the present invention, a composition and method for hydraulically fracturing a subterranean formation is provided. The composition comprises an aqueous mixture of a hydrated polysaccharide, preferably a galactomannan gum, the hydrated polysaccharide having a plurality of bonding sites; a crosslinking agent for crosslinking the hydrated polysaccharide at the bonding sites at the conditions of the subterranean formation with a polyvalent metal ion to form a polyvalent metal crosslink, thereby increasing the viscosity of the hydrated polysaccharide; and a controlled solubility compound for releasing a chelating agent for controllably breaking the polyvalent metal crosslink and bonding with the polyvalent metal ion released by breaking the crosslink, thereby decreasing the viscosity of the hydrated polysaccharide. The method comprises the steps of injecting the above-described composition into the subterranean formation at fracturing pressures; allowing the controlled solubility compound to begin breaking the polyvalent metal crosslink, thereby reducing the viscosity of the hydrated polysaccharide and yielding a lower viscosity fluid; and removing the lower viscosity fluid from the subterranean formation.

5 Claims, 2 Drawing Sheets

OTHER PUBLICATIONS

Jack L. Elbel, "Considerations in Fracture Design," in Michael J. Economides and Kenneth G. Nolte, Reservoir Stimulation, Schlumberger Educational Services, Houston, Chapter 9, pp. 9–1 to 9–10 (1987).

B.L. Gall and C.J. Raible, "Molecular Size Studies of Degraded Fracturing Fluid Polymers," SPE 13566, presented at the International Symposium on Oilfield and Geothermal Chemistry, Phoeniz, AZ, Apr. 9–11, 1985.

D. N. Harry, R. Moorhouse, L. Matthews & G. Chen, "Rheological Responses to Variations in Aqueous–Based Zirconium Crosslinker Chemistry," SPE 37280, presented at 1997 International Symposium on Oilfield Chemistry, Houston, TX, Feb. 18–21, 1997.

G. W. Hawkins, "Laboratory Study of Proppant–Pack Permeability Reduction Caused by Fracturing Fluids Concentrated During Closure," SPE 18261, presented at 63rd Annual Technical Conference and Exhibition of SPE, Houston, TX, Oct. 2–5, 1988.

C. Kormann, D. W. Bahnemann, and M. R. Hoffman, "Preparation and Characterization of Quantum–Size Titanium Dioxide," J. Phys. Chem., 92, 5196–4201 (1988).

J. Kramer, R. K. Prud'homme, P. Wiltzius , P. Wiltzius, P. Mirau, and S. Knoll, "Colloid Science: Comparison of Galactomannan Crosslinking with Organotitanates ad Borates," Colloid & Polymer Sci, 266, 145–155 (1988).

M.L. Samuelson and V.G. Constein, "Effects of High Temperature on Polymer Degradation and Cleanup," SPE 36495, presented at 1996 SPE Annual Technical Conference and Exhibition, Denver, CO, Oct. 6–9, 1996.

Ben Sloat, "Controlled Solubility Phosphates—A Versatile Solution to Oilfield Scale Problems," J. Petr. Tech., 12 (Nov. 1960).

J.R. Van Wazer, E.J. Griffith and J.F. McCullough, "Structure and Properties of the Condensed Phosphates. VII. Hydrolytic Degradation of Pyro–and Tripolyphosphate," J. Am. Chem. Soc., 77, 287–291 (Jan. 20, 1995).

Calgon Composition T Product Specification Sheet (Oct. 13, 1994).

Calgon RC–100 Product Specification Sheet (Jan. 17, 1996).

Calgon RC–104 Product Specification Sheet (Jan. 15, 1996).

Calgon Composition TG–10 Product Specification Sheet (Jan. 17, 1996).

Calgon Composition TG–10 MSDS (pp. 1, 3, & 5) (Jan. 19, 1994).

Calgon Composition T MSDS (pp. 1, 3 & 5) (Jun. 19, 1993).

Calgon RC–100 MSDS (pp. 1, 3 & 5) (Jan. 18, 1994).

* cited by examiner

CLEANUP ADDITIVE

FIELD OF THE INVENTION

The present invention relates to polymer returns during flowback after proppant placement with a conventional polymer gel; more particularly, it relates to using chelants to increase the return of crosslinked polymers.

DESCRIPTION OF THE PRIOR ART

In the recovery of hydrocarbons from subterranean formations, it is common practice to subject the formation to a fracturing treatment. The fracturing treatment is designed to provide flow channels in the formation and enhance recovery of the hydrocarbons.

During hydraulic fracturing, a fracturing fluid is injected down a wellbore under pressure and forced against the formation strata to penetrate the formation and create flow channels. The fracturing fluid generally contains at least a thickened or gelled aqueous solution and proppant particles. The thickened or gelled aqueous solution must be of sufficient viscosity that it can penetrate the formation strata under the applied pressure.

Natural polymers including polysaccharides have been crosslinked to yield the thickened or gelled aqueous solution. The crosslinker binds the molecular strands of the polymer into a network which provides needed viscosity to carry proppants into the formation. Borate, titanate, and zirconate are preferred crosslinkers.

Proppants are carried with the solution into the created fractures or conductive channels. When the fracturing pressure is removed, the proppants remain in the fractures and prevent the fractures from closing—they prop open the fractures. Typical proppants include sand, walnut shells, and sintered bauxite. Others are known in the art.

After the fracturing is complete, it is desirable to remove the thickened or gelled aqueous solution. The recovery of the fracturing fluid is accomplished by reducing its viscosity to a low value such that it flows naturally from the formation under the influence of formation fluids. If the thickened or gelled aqueous solution is a conventional polymer gel, there are typically two ways to remove the polymer gel (or at least to increase the polymer return during flowback): (1) break down the polymer and (2) break down the crosslinking bonds.

Conventional breakers break down the polymer. They reduce the polymer's molecular weight by the action of an acid, an oxidizer, an enzyme, or some combination of these on the polymer itself. Thermal energy may also be used to break down conventional polymer gels.

However, if the conventional polymer gel is guar or a substituted guar, an important risk arises when conventional breakers or thermal energy is used to break down the polymer. Guars are made water soluble by the galactose side chains but have a mannose backbone which is insoluble. Because of the mannose backbone, the breaker or thermal reactions may create smaller but insoluble fragments (or residues). These insoluble residues can prevent the complete opening of the fractures and may occlude previously open pathways.

With regard to breaking down crosslinks, pH variations may be used. This is particularly true with borate-crosslinked gels. Borate crosslinks are reversibly created by increasing the pH and therefore increasing the effective concentration of the active crosslinker, the borate anion. The borate/polymer bonds can just as easily be eliminated by lowering the pH. At a high pH above 8, the borate ion exists and is available to crosslink and cause gelling. At lower pH, the borate is tied up by hydrogen and is not available for crosslinking, thus gellation caused by borate ion is reversible. The borate/polymer bond is ionic.

Other crosslinks are more difficult to break down and require extra care. For example, zirconate crosslinked polymers are known to have poor clean-up properties, i.e., they leave behind excess polymer in the formation. Other metal crosslinks are also difficult to eliminate. It is believed that compounds sufficient to break down metal crosslinks will generally also produce insoluble residues. More insoluble residue is produced after the break if there is more crosslinker present initially. It is noteworthy that zirconate crosslinked polymers are a component in major hydraulic fracturing fluids for wells with bottom hole temperatures of 200–375° F. The bond between the zirconium ion and the polymer is ionic and forms a coordination complex. Since this complex is quite stable at the bottom hole temperature noted above, the zirconium bond acts as though it is essentially covalent.

Fortunately, chelating or complexing agents can break down some metal crosslinks. Traditionally conventional polymer gels can be degelled by a process consisting of bringing the gel in the well into contact with an aqueous solution of a complexing agent able to form with the polyvalent metal ion a coordination complex which is thermodynamically more stable than that which the ion forms with the polymer. Some compounds attempt to disrupt the metal crosslink by undergoing hydrolysis to form a free, active ligand or chelator. But, zirconium crosslinked polymers continue to present problems for breaking down crosslinks. Accordingly, there is a need to provide an improved composition and method for cleaning up zirconate crosslinked polymers and thereby, increasing the final fracture conductivity.

It is also important to manage the timing of the viscosity reduction. Polymer gels which break down prematurely can cause suspended proppant material to settle out of the gel before being introduced a sufficient distance into the produced fracture. Premature break down can also result in a less than desirable fracture width in the fracture being created. On the other hand, polymer gels which break down too slowly can cause slow recovery of the polymer from the produced fracture. It is desirable for the polymer gel to retain its fracturing viscosity for the time necessary to complete the fracturing fluid injection. It is further desirable to achieve sufficient polymer returns within 2–5 days of injecting the fracturing fluid. Therefore, a need also exists for providing a composition and method with time-controlled break down of crosslinking bonds.

SUMMARY OF THE INVENTION

According to the present invention, a composition and method for hydraulically fracturing a subterranean formation and increasing the return of crosslinked polymers is provided. More specifically, there is provided a composition comprising an aqueous mixture of a hydrated polysaccharide, preferably a galactomannangum, the hydrated polysaccharide having a plurality of bonding sites; a crosslinking agent for crosslinking the hydrated polysaccharide at the bonding sites at the conditions of the subterranean formation with a polyvalent metal ion to form a polyvalent metal crosslink, thereby increasing the viscosity of the hydrated polysaccharide; and a controlled solubility compound for releasing a chelating agent for controllably breaking the polyvalent metal crosslink and bonding with the polyvalent metal ion resulting from breaking said crosslink, thereby decreasing the viscosity of the hydrated polysaccharide.

The controlled solubility compound is the cleanup additive. The cleanup additive breaks down the polyvalent metal crosslink to reduce the viscosity of the polymer gel, wherein the polysaccharide is the polymer, and facilitate the removal of the polymer gel after the fracture operation is completed. The controlled solubility compound produces a complexing agent which is able to form a coordination complex with the polyvalent metal ion which is thermodynamically more stable than that which the ion forms with the polymer.

BRIEF DESCRIPTION OF THE DRAWINGS

A better understanding of the present invention may be had by reference to the drawings wherein.

DESCRIPTION OF THE INVENTION

Figure 1:
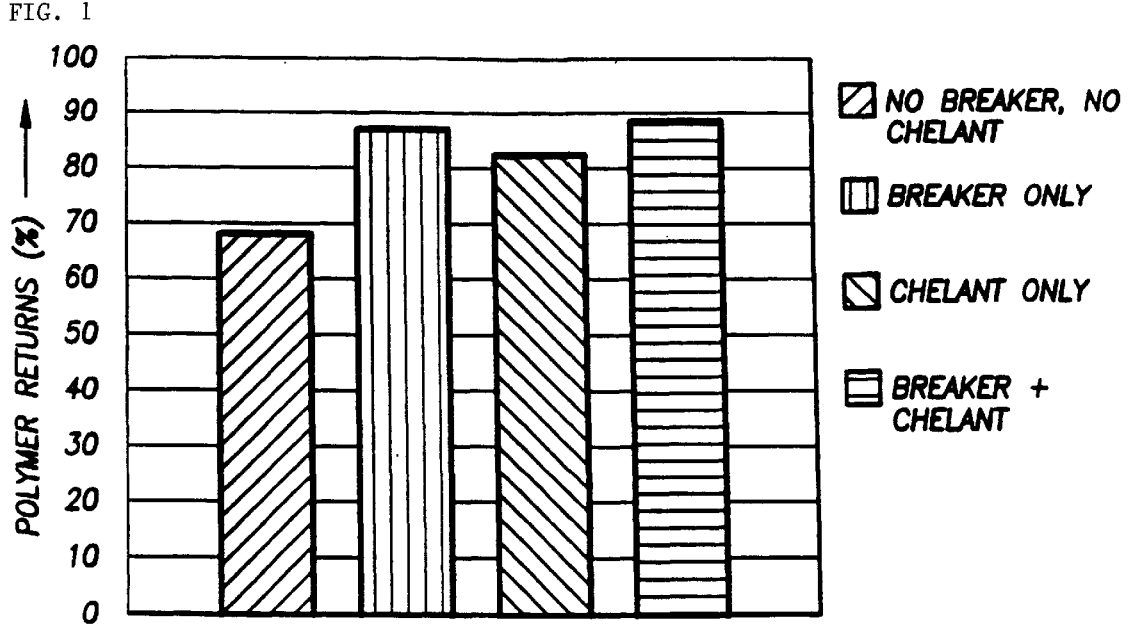
FIG. 1 is a graph which shows that the addition of controlled solubility polyphosphate results in significantly better cleanup than a conventional breaker alone for a 45 pound per 1000 gallon zirconate crosslinked fluid at 275° F. The breaker used was an encapsulated oxidative breaker.
Figure 2:
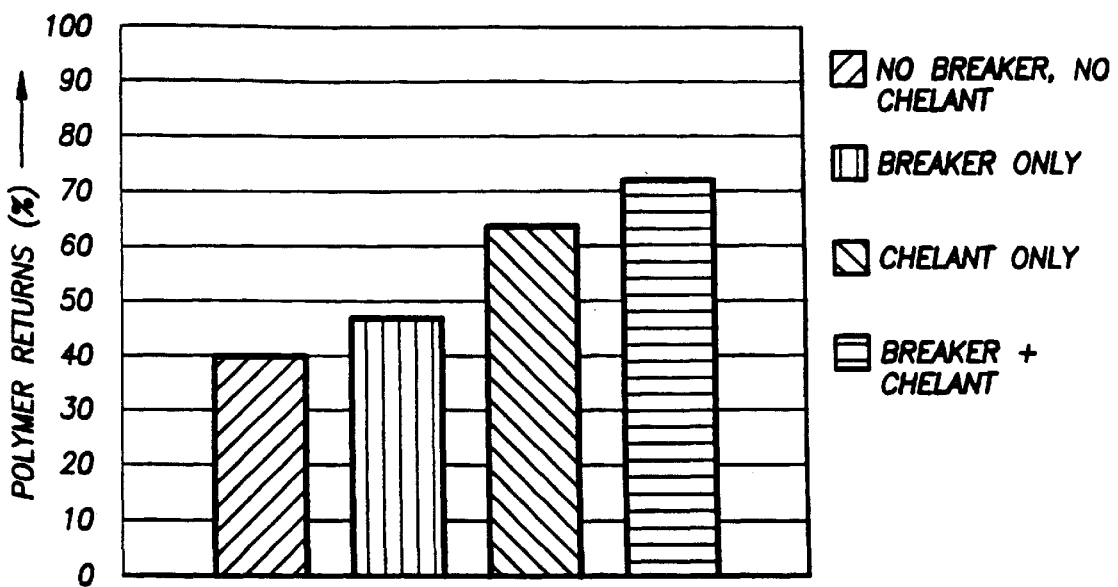
FIG. 2 is a graph which shows that the addition of controlled solubility polyphosphate provides superior cleanup of zirconate crosslinked fluids at 250° F.
Figure 3:
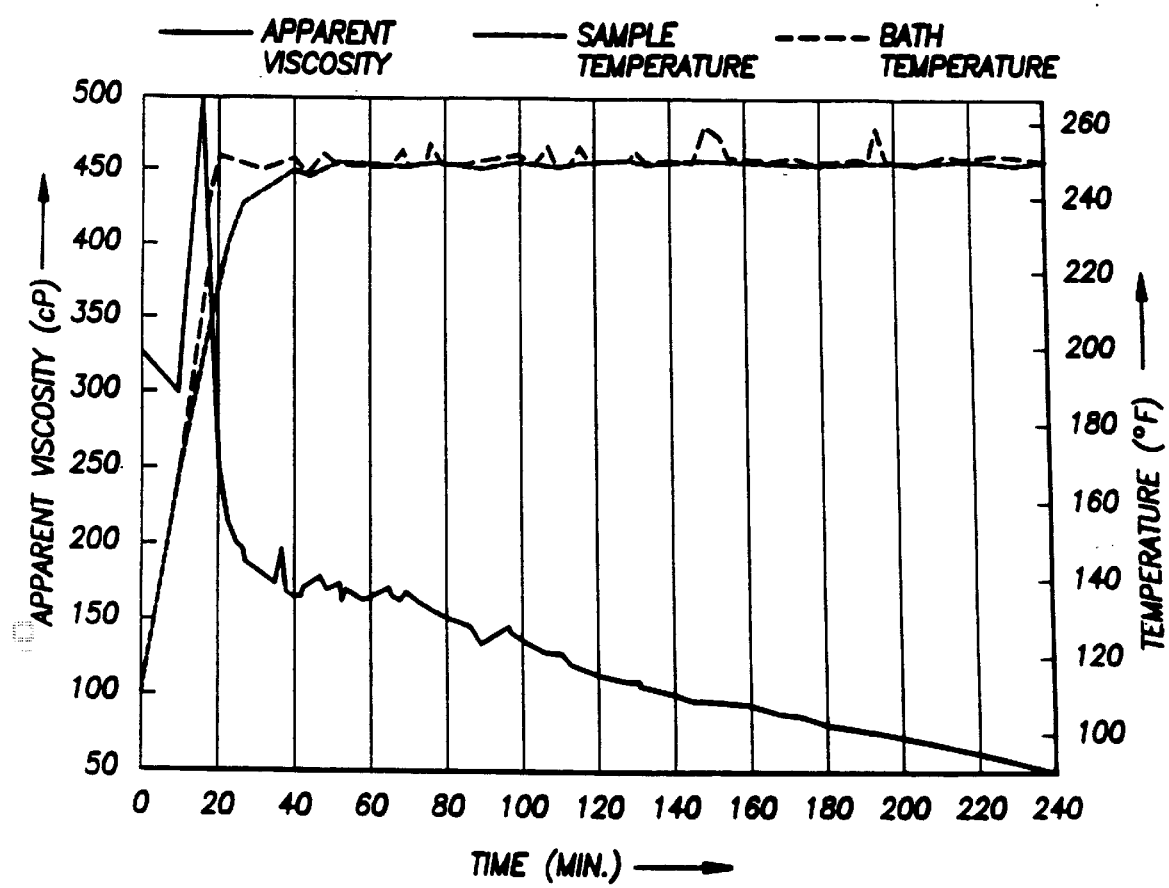
FIG. 3 shows that even though the controlled solubility polyphosphate is present, the zirconate crosslinked fluid obtains sufficient viscosity to be useful in conventional hydraulic fracturing operations.
Figure 4:
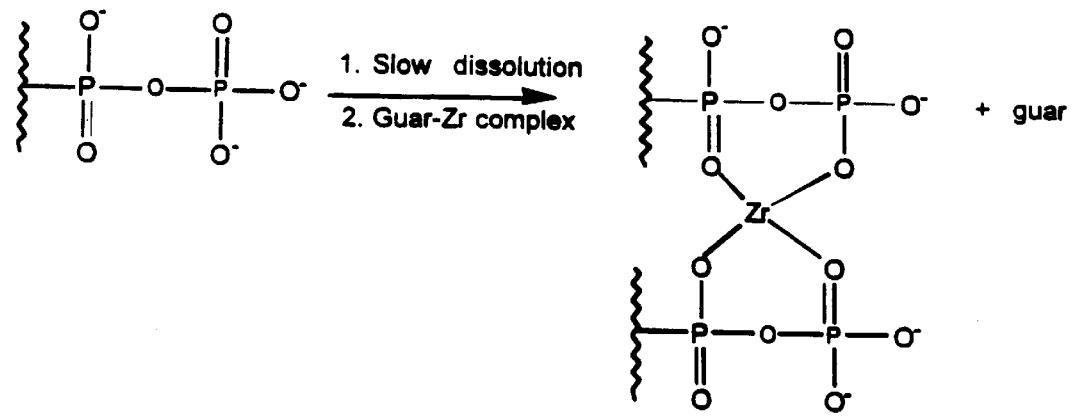
FIG. 4 provides a description of the formation of the zirconium-polyphosphatecomplex following dissolution of a controlled solubility polyphosphate and breaking of the zirconate crosslink.

A composition for hydraulically fracturing a subterranean formation is provided which comprises an aqueous mixture of a hydrated polysaccharide, preferably a galactomannan gum, the hydrated polysaccharide having a plurality of bonding sites; a crosslinking agent for crosslinking the hydrated polysaccharide at the bonding sites at the conditions of the subterranean formation with a polyvalent metal-containing ion to form a polyvalent metal crosslink, thereby increasing the viscosity of the hydrated polysaccharide; and a controlled solubility compound for releasing a chelating agent for controllably breaking the polyvalent metal crosslink and bonding with the polyvalent metal ion, thereby decreasing the viscosity of the hydrated polysaccharide.

The invention also includes a method for making a fracturing composition for hydraulically fracturing a subterranean formation comprising mixing an amount of an aqueous mixture of a hydrated polysaccharide, preferably a galactomannan gum, the hydrated polysaccharide having a plurality of bonding sites with a crosslinking agent for crosslinking the hydrated polysaccharide at the bonding sites at the conditions of the subterranean formation with a polyvalent metal ion to form a polyvalent metal crosslink, thereby increasing the viscosity of the hydrated polysaccharide and admixing a controlled solubility compound for releasing a chelating agent for controllably breaking the polyvalent metal crosslink and bonding with the polyvalent metal ion resulting from breaking the crosslink, thereby decreasing the viscosity of the hydrated polysaccharide.

The gelling agent used in this invention is a high molecular weight water-soluble polysaccharide, which can complex with crosslinking agents such as transition metals, for example, zirconium and titanium. The most useful polysaccharides for the practice of this invention have molecular weights in the range of about 200,000 to 3,000,000. Galactomannan gum as employed herein refers to those natural occurring polysaccharides derived from various endosperms of seeds. They are primarily composed of D-mannose and D-galactose units. They generally have similar physical properties, such as being soluble in water to form thick highly viscous solutions which usually can be gelled (crosslinked) by the addition of such inorganic salts as borax. Examples of some plants producing seeds containing galactomannan gums include Tara, Huizache, locust bean, Pola verde, Flame tree, guar bean plant, Honey locust, Luceme, Kentucky coffee bean, Japanese pagoda tree, Indigo, Jenna, Rattlehox, Clover, Fenergruk seeds and Soy bean hulls. The gum is provided in a convenient particulate form generally smaller than that which will be retained on a No. 20 mesh sieve (U.S. Standard Sieve Series) but larger than that which passes through a No. 200 mesh sieve. Of these polysaccharides, guar and its derivatives are preferred. Specifically, these include guar gum, locust bean gum, karaya gum, carboxymethylguar, hydroxyethylguar, carboxymethylhydroxyethylguar, hydroxypropylguar (HPG), carboxymethylhydroxypropylguar, and combinations thereof. Guar is a branched copolymer composed of a mannose backbone with galactose branches.

The polysaccharides are generally provided to a blender in solid, powder form, or more typically, suspended in a hydrocarbon such as diesel or kerosene. When added to a neutral or acidic aqueous solution, the polysaccharides, e.g., galactomannan gum, hydrate to form a gel. Optimal hydration of the polysaccharides, e.g., guar and HPG, will only take place under neutral or acidic conditions, that is, at a pH of about 7 or less.

Because such polysaccharides, e.g. guar and HPG, disperse readily at high pH, the water pH is preferably raised, for example, with a buffer during blending of the polymer powder and then the pH should be lowered to slightly acidic to maximize gelation and achieve higher base viscosity. This method significantly reduces the formation of "fish eyes" and produces a higher quality base gel. The gel mixing process can be simplified by using a slurried polymer, i.e., polysaccharides, (slurried in diesel, kerosene or any other non-solvent) instead of the polymer powder.

The fracturing fluid preferably contains from about 15 to about 75 pounds of polysaccharide per 1000 gallons of fracturing fluid, more preferably from about 30 to about 60 pounds of polysaccharide per 1000 gallons of fracturing fluid.

The crosslinking agent utilized in the present invention must be capable of yielding ions which crosslink the polysaccharide, for example, zirconate and titanate ions, preferably, zirconate ions. Such crosslinking agents are known in the art and the selection of such crosslinking agents and corresponding polysaccharide allows operations over a pH ranging from less than 1 to greater than 12, at a bottom hole temperature ranging from less than 100° F. to greater than 400° F. Examples of suitable crosslinking agent include zirconium acetate, zirconium lactate, zirconium malate, zirconium citrate, titanium lactate, titanium malate, titanium citrate and the like. A zirconium/triethanolamine complex is also suitable for applications where the bottom hole temperature is in excess of 200° F. and the pH is in excess of 7. See U.S. Pat. No. 4,534,870, hereby incorporated by reference. See also U.S. Pat. Nos. 4,579,670 and 4,683,068, which are also hereby incorporated by reference.

The crosslinking agent is preferably present in an amount ranging from about 0.1 to about 2 gallons per 1000 gallons of fracturing fluid.

In the present invention, a "controlled solubility compound" means a compound which is non-hydrolyzable and dissolves in an aqueous solution, such as in the aqueous based fracturing fluid of the present invention, and then releases chelating agent for controllably breaking the polyvalent metal crosslink in the crosslinked polysaccharide and then bonding with the polyvalent metal ion produced by breaking said crosslink, thereby decreasing the viscosity of the hydrated polysaccharide. The controlled solubility compound is preferably selected from the group consisting of oxalates, phosphates, metaphosphates, and polyphosphate glasses. More preferably, the controlled solubility compound is selected from the group consisting of calcium oxalate, calcium phosphate, aluminum metaphosphate, sodium zinc potassium polyphosphate glass, and sodium calcium magnesium polyphosphate glass.

Such materials are known in the art. For example, U.S. Pat. Nos. 2,601,395 and 4,326,873 disclose processes for manufacturing polyphosphate glasses and are hereby incorporated herein by reference. Such materials are also commercially available, for example, from Calgon Corp., Pittsburgh, Pa., such as Composition T which is a sodium zinc potassium polyphosphate glass and Calgon 29L which is a sodium calcium magnesium polyphosphate glass.

A pH control agent may also be used with the fracturing fluid of the present invention. Those skilled in the art recognize that crosslinking agents each have a pH range over which they operate effectively. The pH control additives which may be an acid, base, buffer or any combination of these are added in an amount sufficient to adjust the pH in the fracturing fluid to the desired range or values. Examples of acids include hydrochloric acid, fumaric acid, acetic acid and adipic acid.

Certain pH control agents release hydroxyl ions. Such pH control agents may be any soluble or partially soluble hydroxide or carbonate that provides the desirable pH value in the fracturing fluid to promote ion formation by the crosslinking agent and crosslinking with the polysaccharide. The alkali metal hydroxides, e.g., sodium hydroxide, and carbonates are preferred. Other acceptable materials are $Ca(OH)_2$, $Mg(OH)_2$, $Bi(OH)_3$, $Co(OH)_2$, $Pb(OH)_2$, $Ni(OH)_2$, $Ba(OH)_2$ and $Sr(OH)_2$. At temperatures above about 175° F., potassium fluoride (KF) is used to prevent the precipitation of MgO when $Mg(OH)_2$ is used as a base, i.e., hydroxyl ion releasing agent.

A buffering agent may be employed in the practice of the present invention to buffer the fracturing fluid, i.e., moderate amounts of either a strong base or acid may be added without causing any large change in pH value of the fracturing fluid. The buffering agent may be a combination of a weak acid and a salt of the weak acid; an acid salt with a normal salt; or two acid salts. Examples of suitable buffering agents which may be employed to provide a fracturing fluid having the desired pH value are sodium carbonate-sodium bicarbonate; and sodium bicarbonate, or other like agents. By employing a buffering agent instead of merely a hydroxyl ion producing material, a fracturing fluid is provided which is more stable to a wide variance of pH values found in local water supplies and to the influence of acidic materials located in formations and the like. The pH control agent may be varied between about 0.6 percent and about 40 percent by weight of the polysaccharide employed.

In practicing the present invention, conventional breakers may also be used and added to the fracturing composition. Conventional breakers reduce the polymer's molecular weight by the action of an acid, an oxidizer, an enzyme, or some combination of these on the polymer itself. The acid-type of breaker may be esters which convert to acids under well-treating conditions. See, for example, U.S. Pat. No. 3,960,736, which is hereby incorporated by reference.

The specific breaker employed will depend on the temperature to which polymer gel is subjected. At temperatures ranging from about 125° F. to about 200° F., an inorganic breaker or oxidizing agent, e.g., $KBrO_3$, and other similar materials, e.g., $KClO_3$, $KIO_3$, peroxides, perborates, persulfates, permanganates (for example, ammonium persulfate, sodium persulfate, and potassium persulfate) and the like, are used to control degradation of the polymer gel. At about 200° F. and above, typical breakers include sodium bromate.

At temperatures ranging from about 60° F. to about 140° F., an enzyme may be employed. Enzymes suitable for this purpose are those which catalyze the hydrolysis of the glycosidic bonds between the monomer units of the polysaccharide. The selection of a suitable enzyme for a particular polysaccharide, e.g., galactomannan gum, can be determined from references well known in the art. See, for example, Smith and Montgomery, The Chemistry of Plant Gums, Monograph Series, No. 141, 1959, pp. 151–156. The amount of enzyme employed in any particular gel solution will depend on the amount of galactomannan gum present, and also upon the temperature and pH to which the polymer gel is to be subjected. Generally, about 0.01 to about 2.0 percent by weight of enzyme of the weight of gum employed is satisfactory.

Any of a variety of conventional propping agents may be employed with the fracturing fluid of the present invention, such as quartz sand grains, sintered bauxite, tempered glass beads, rounded walnut shell fragments, aluminum pellets, nylon pellets, and similar materials. Such agents are normally used in concentrations between about 1 to 8 pounds per gallon of fracturing fluid composition, but higher or lower concentrations can be used as required.

The fracturing fluid of this invention can also contain other conventional additives which are added in known amounts and by conventional techniques, for example, friction reducers (e.g. polyacrylamides, etc.), stabilizers (e.g., methanol, alkali metal thiosulfate, ammoniumthiosulfate, etc.), fluid loss control additives, surfactants, clay stabilizers (e.g., tetramethylammonium chloride, etc.), bactericides, iron control agents, concentrations of salts which are compatible with the gelling agent, oxygen scavengers, and water soluble alcohols, particularly alcohols having 1 to 3 carbon atoms. See, U.S. Pat. No. 4,683,068, already incorporated by reference.

The invention also provides a method of fracturing a subterranean formation comprising the steps of injecting the above-described composition into the subterranean formation at fracturing pressures and at a rate sufficient to fracture the subterranean formation and place propping agents in the resulting fractures; allowing the controlled solubility compound to begin breaking the polyvalent metal crosslink, thereby reducing the viscosity of the hydrated galactomannan gum and yielding a lower viscosity fluid; and removing the lower viscosity fluid. This method is preferably used in situations where the formation temperature ranges from about 200° F. to about 425° F., though it may be used for temperatures at least as low as 175° F. If only small amounts of the controlled solubility compound are used, a slurry is a preferred method of addition. Also, note that the controlled solubility compound must not dissolve in the slurry medium.

A method of selectively predetermining the elapsed time prior to activating the breaking of a viscous gel to conform to variables in a particular fracturing event is also provided. It comprises selecting the above-described composition based on the variables for the particular fracturing event; injecting the composition into a subterranean formation; reacting the hydrated polysaccharide with the crosslinking agent to form a viscous gel; hydraulically fracturing the subterranean formation; and chelating the crosslinking agent with the chelating agent to break the viscous gel. The dissolution rate of the controlled solubility compounds depends upon the chemical composition of the controlled solubility compound, its surface area (particle size), the temperature, and the presence of dissolved salts in the solvent water. And, variables which may affect the fracturing event and the degree of fracture include injection time, formation temperature, fluid pH, fluid salinity, and formation water pH and salinity. To select an appropriate composition and predetermine the elapsed time, a person of ordinary skill in the art can evaluate the dissolution rate of controlled solubility compounds in view of his/her understanding of the fracturing event variables and use that information to make an appropriate choice. The examples demonstrate how selected controlled solubility compounds function under certain simulated fracturing conditions. Based upon this disclosure and relying upon certain simulated fracturing conditions, a person of ordinary skill in the art can easily evaluate controlled solubility compounds under various fracturing conditions. Commonly available solubility tables for inorganic compounds can facilitate the identification of potential controlled solubility compounds in view of the fracturing environment. See for example, "Physical Constants of Inorganic Compounds" in CRC Handbook of Chemistry and Physics (Robert C. Weaver & Melvin J. Astle eds., 63rd ed. 1982), "Solubilities of Inorganic Compounds and Metal Salts of Organic Acids in Water at Various Temperatures" in Lange's Handbook of Chemistry (John A. Dean ed., 13th ed. 1985), and "Solubilities of Inorganic Compounds in Water at Various Temperatures" in Perry's Chemical Engineers' Handbook (Robert H. Perry et al. eds., 4th ed. 1963).

Selection of appropriate controlled solubility compounds to break down the crosslink requires consideration of several properties. Those properties include polymer solubility, fluid pH, and the physical and chemical characteristics of the controlled solubility compound. With these properties in mind, it is desirable to achieve polymer flowbacks for polyvalent metal-crosslinked polysaccharides, for example, zirconate-crosslinked polysaccharides, which are comparable to those for borate-crosslinked polysaccharides. Accordingly, dissolution and other comparisons between zirconate- and borate-crosslinked polysaccharides are appropriate.

With regard to solubility, it is worth noting that filter cake of metal crosslinked fluids is significantly less soluble than filter cake of crosslinked borate fluids (referred to as borate filter cake). Reduction of the damaging character of filter cake is important since the formation of thick filter cake is believed to be a contributing factor to blockage of the proppant pack which eventually may result in poor clean-up for a fracturing fluid.

Table 1 shows solubility of borate and zirconate filter cakes in a 2% potassium chloride solution. The borate and zirconate filter cakes were prepared at a concentration of 40 pounds of guar per 1000 gallons of fracturing fluid.

TABLE 1

| | | Solubility | |
|---|---|---|---|
| Time (Hours) | Temperature (° F.) | Borate Filter Cake | Zirconate Filter Cake |
| 1.5 | ambient | dissolved | not dissolved |
| 5.0 | ambient | | not dissolved(#) |
| 1.5 | 200 | dissolved(*) | little dissolved |

(#) At ambient temperature and 12 pH, there is no dissolution for 16 hours.
(*) At 12 pH.

The data of Table 1 indicate that at ambient temperature, zirconate filter cake is not dissolved for at least 5 hours while borate filter cake is dissolved within 1.5 hours. The rapid dissolution of the borate filter cake is expected because at about normal pH, all borate crosslinks are disrupted thereby lowering the molecular weight of the gel and increasing its solubility. Zirconate-crosslinked guar-based fracturing fluids have a pH of approximately 9 while high temperature borate fluids have a pH of greater than about 11 at ambient temperature. Notably, at about 12 pH and 200° F., borate filter cake continues to dissolve within 1.5 hours, but the zirconate filter cake remained relatively insoluble at 200° F. after 1.5 hours.

Table 2 demonstrates the effect of pH on the solubility of zirconate filter cakes. In each test, 2% potassium chloride was added to 100 mg of filter cake. Adjustment of the pH was accomplished with hydrochloric acid, sodium hydroxide, sodium carbonate, or sodium bicarbonate.

TABLE 2

| | Solubility (Conditions) | | |
|---|---|---|---|
| pH | 2 hours @ 200° F. | 4 hours @ 200° F. | 4 hours @ 200° F., then 16 hours @ ambient |
| 2.96 | — | 50% | dissolved |
| 3.98 | — | — | — |
| 5.97 | — | — | — |
| 7.00 | — | — | — |
| 8.26 | — | — | — |
| 9.88 | — | — | — |

TABLE 2-continued

| | Solubility (Conditions) | | |
|---|---|---|---|
| pH | 2 hours @ 200° F. | 4 hours @ 200° F. | 4 hours @ 200° F., then 16 hours @ ambient |
| 10.42 | — | — | — |
| 12.04 | — | — | crushed or slightly dissolved |

(-) indicates that the filter cake was insoluble.

In the absence of chelants, only extreme pH values (less than about 3 pH or greater than about 12 pH) help to solubilize zirconate filter cake.

Table 3 demonstrates the effect of sodium tripolyphosphate, a metal chelating agent, at about 9 pH. As previously-noted, zirconate-crosslinked guar-based fluids have a pH of approximately 9. The sample used 18 mg (7.2 ppt, "pounds per thousand gallons of fracturing fluid") of sodium tripolyphosphate ("STP"). Also, 2% potassium chloride was added to 100 mg of filter cake.

TABLE 3

| | Solubility (Conditions) | | |
|---|---|---|---|
| pH | 2 hours @ 200° F. | 4 hours @ 200° F. | 4 hours @ 200° F., then 16 hours @ ambient |
| 8.81 | 50% | dissolved | dissolved |

The tests indicate that STP is highly effective at dissolving zirconate filter cake and substantially better than pH-promoted solubilization. Although not shown in Table 3, sodium pyrophosphate demonstrated dissolution efficacy similar to that of sodium tripolyphosphate.

To determine whether dissolution of zirconate filter cake will improve cleanup properties of zirconate fracturing fluids, conductivity tests were performed on filter cakes with a concentration of 40 pounds of guar per 1000 gallons of fracturing fluid. The tests were performed according to API Standard RP61, which is incorporated herein by reference. Table 4 provides conductivity and polymer return data after about 50 hours flowback.

TABLE 4

| Zr Crosslinker, gpt | Breaker, ppt | STP, ppt | Conductivity, D | Polymer Return, % |
|---|---|---|---|---|
| | | | 43, 38 | 83 |
| | 1 | | 75 | 79 |
| 0.3 | | | 24,25 | 42, 37 |
| 0.3 | 1 | | 0, 46, 40, 31 | 45, 57 |
| 0.3 | | 6 | 33, 55 | 80 |
| 0.3 | | 10 | 33 | 83 |
| 0.3 | 1 | 6 | 20, 39, 33 | 65, 82 |
| 0.3 | 1 | 10 | 56, 119, 53 | >82, 96 |

"gpt" is gallons per thousand gallons of fracturing fluid; "ppt" is pounds per thousand gallons of fracturing fluid. The polymer return percentage is on weight by weight percent (w/w%).

Table 4 reveals that polymer return is consistently higher when STP is used. Up to about a 60–70% increase in polymer return is achieved with STP. However, there is no specific trend in conductivity numbers relative to polymer returns. Relatively low conductivity data obtained with STP may be due to the nonlinear relationship between polymer return and conductivity. The data of Table 4 show that zirconium chelating compounds are capable of cleaving the zirconate crosslink and thereby, dissolve zirconate filter cake.

Because chelating agents interfere with the crosslinking mechanism, the rheology of the polymer gel should be affected. Therefore, it is also important to manage the timing of the viscosity reduction. Polymer gels which break down prematurely can cause suspended proppant material to settle out of the gel before being introduced a sufficient distance into the produced fracture. Premature break down can also result in a less than desirable fracture width in the fracture being created. On the other hand, polymer gels which break down too slowly can cause slow recovery of the polymer from the produced fracture. Appropriately-timed crosslink breaks occur when controlled solubility compounds are used and depend on their dissolution rate.

In general, the dissolution rate of the controlled solubility compounds depends upon the chemical composition of the controlled solubility compound, its surface area (particle size), the temperature, and the presence of dissolved salts in the solvent water. In the particular case of polyphosphate glasses, the delay time is affected by particle size, specific metal ion(s) in the salt, and preparation conditions of the polyphosphate glasses (e.g. calcination time and temperature).

Examples of controlled soluble phosphates are fused sodium-calcium, sodium-magnesium, sodium-calcium-magnesium, sodium-potassium-zinc, and sodium-zinc phosphates. When sodium-calcium phosphates are the controlled solubility compound, their cation composition can vary from 100% $Na_2O.P_2O_5$ to 100% $CaO.P_2O_5$. Sodium phosphate ($Na_2O.P_2O_5$) dissolves in water at a rate of over 10,000% per month while calcium phosphate ($CaO.P_2O_5$) dissolves in water at a rate of about 5% per month. With regard to surface area effects on dissolution rates, it was found that a specific mixed $Na_2O.CaO.P_2O_5$ system of 2 square feet per pound dissolves at less than 10% per month while the same composition at 15 square feet per pound dissolves at about 60% per month. Temperature effects on dissolution rates are shown by another controlled solubility compound with increases in solubility by about 35% for each 10° F. increase in temperature at temperatures above about 90° F. Also, solubilities decrease with increasing amounts of other total dissolved solids. Rates of dissolution of sodium-magnesium and sodium-zinc phosphates vary similarly. Thus, the rates of dissolution can be controlled and selected by choosing the appropriate controlled solubility compound and particle size for the temperature, pH, and water salinity of the formation to be fractured as well as the desired release time and chelating agent concentration. This selection procedure is equally applicable to other controlled solubility compounds including calcium oxalate.

EXAMPLES

The following examples merely exemplify various embodiments of the invention. It is understood that the following examples are provided to further illustrate the invention. They do not in anyway limit the scope of the present invention.

Test compositions were prepared with Calgon 29L, sodium calcium magnesium polyphosphate glass, as a 10–30 mesh particle. The Calgon 29L particles dissolved in 140–180° F. water at a rate of 10–20% per month. Because this dissolution rate is too slow for a fracturing fluid cleanup additive, samples of Calgon 29L were hand ground with a mortar and pestle. The ground material was sieved through standard screens to yield samples of various particle size.

The test compositions were tested for rheological properties and conductivity. All compositions were prepared with deionized water. Fann 50's were used to determine whether the compositions could achieve sufficient viscosity to transport proppants and lose sufficient viscosity to break properly. The rheological tests were run in accordance with American Petroleum Institute method API 93F, which is incorporated herein by reference.

Conductivity cell tests were performed to determine whether the loss in viscosity would yield increased fracture conductivity. In order to simulate field conditions, the conductivity tests were run by adding fluid to the cell as usual, but then applying the closure pressure with the exit line open. Thus, excess fluid was extruded from the cell during this step, rather than through the cell's rock walls. There was no concentration of polymer due to fluid loss. Larger proppants were used in the exit line to prevent proppant production during closure. Flowback was started immediately and typically continued for about 16–18 hours. The cell was initially loaded with 80 ml of a high temperature zirconate-crosslinked guar at a concentration of 35 pounds of guar per 1000 gallons of fracturing fluid with a final closure stress of 5000 psi and a flowback rate of 3.0 ml/min.

The amount of polymer left in the cell after conductivity experiments was determined by difference: samples of the initial fluid and of the effluent, including the material extruded from the cell during closure, were analyzed; and after the polysaccharide was hydrolyzed, dehydrated, and condensed with phenol in concentrated sulfuric acid, the polymer was analyzed by spectrophotometry.

For Table 5, the compositions were prepared with a high temperature zirconate-crosslinked guar at a concentration of 35 pounds of guar per 1000 gallons of fracturing fluid. An aqueous organo-zirconium complex available as ZXL-750 from Benchmark, Midland, Tex., in the amount of 0.225 gpt was used to crosslink the guar. All compositions also contained a 2% potassium chloride in deionized water solution.

TABLE 5

Rheology of Fluids Containing Zirconate Cleanup Additives, at no shear

| Composition | Breaker (*) | ppt Additive (mesh) | Initial/Final pH | Initial cP | cP @ 100 min | cP @ 240 min | min @ 100 cP | ppt inorganic base/ inorganic buffer |
|---|---|---|---|---|---|---|---|---|
| 1 | | | 8.9/8.6 | 1200 | 450 | 175 | >240 | 1.5/4.5 |
| 2 | | | 8.9/8.6 | 800 | 275 | 140 | >240 | 1.5/4.5 |
| 3 | 0.3 | | 8.9/8.3 | 400 | 175 | 75 | 160 | 1.5/4.5 |
| 4 | 0.3 | | 8.9/8.1 | 300 | 150 | 60 | 150 | 1.5/4.5 |
| 5 | | 1 Composition T | 8.9/8.0 | 500 | 150 | 40 | 160 | 1.5/4.5 |
| 6 | | 3 29L (10/30) | 8.9/8.9 | 500 | 300 | 140 | >240 | 1.5/4.5 |
| 7 | | 1 29L (10/30) | 9.1/8.5 | 650 | 450 | 180 | >240 | 1.5/4.5 |
| 8 | | 0.5 29L (10/30) | 9.0/8.5 | 800 | 180 | 50 | 140 | 1.5/4.5 |
| 9 | | 0.5 29L (10/30) | 8.9/8.4 | 1200 | 550 | 300 | >240 | 1.5/4.5 |
| 10 | | 0.5 29L (70/100) | 9.1/8.5 | 500 | 200 | 30 | 125 | 1.5/4.5 |
| 11 | | 0.5 29L (70/100) | 9.0/8.4 | 1000 | 100 | 100 | 100 | 1.5/4.5 |
| 12 | 0.3 | 0.5 29L (70/100) | 8.8/8.5 | 150 | 5 | | | 1.5/4.5 |
| 13 | 0.3 | 0.5 29L (70/100) | 9.1/8.5 | 650 | 90 | | 90 | 1.5/4.5 |
| 14 | | 0.5 29L (thru 100) | 8.9/8.5 | 140 | 30 | 15 | 10 | 1.5/4.5 |
| 15 | | 0.5 29L (thru 100) | 8.9/8.5 | 220 | | | 15 | 1.5/6.25 |
| 16 | 0.3 | 0.5 29L (thru 100) | 8.7/7.9 | 350 | 10 | | 45 | 1.5/4.5 |
| 17 | 0.3 | 0.5 29L (thru 100) | 8.9/8.1 | 450 | 25 | | 40 | 1.5/4.5 |
| 18 | | 5 Na hexametaphosphate | 7.6/7.0 | 35 | | | | 1.5/4.5 |
| 19 | | 5 Na hexametaphosphate | 8.5/7.5 | 30 | | | | 1.5/4.5 |
| 20 | | 5 Na pyrophosphate | 9.2/9.0 | 40 | | | | 1.5/4.5 |
| 21 | | 5 Na pyrophosphate | 8.8/8.0 | 30 | | 5 | | 1.5/4.5 |
| 22 | | 5 Ca phosphate | 7.5/7.3 | 200 | 15 | | 1 | 1.5/4.5 |
| 23 | | 2 Ca phosphate | 9.4/8.8 | 300 | | | 20 | 3/4.5 |
| 24 | | 2 Ca phosphate | 9.4/8.8 | 500 | 35 | | 10 | 3/4.5 |
| 25 | | 1 Ca phosphate | 8.9/8.1 | 260 | 50 | 15 | 35 | 1.5/4.5 |
| 26 | | 1 Ca phosphate | 8.9/7.7 | 400 | 50 | 5 | 60 | 1.5/4.5 |
| 27 | | 1 Ca phosphate | 8.9/8.4 | 800 | 325 | 150 | >240 | 1.5/6.25 |
| 28 | | 1 Ca phosphate | 9.0/8.5 | 800 | 300 | 150 | >240 | 1.5/6.25 |
| 29 | | 0.5 Ca phosphate | 8.9/8.1 | 650 | 175 | 40 | 150 | 1.5/4.5 |
| 30 | | 0.5 Ca phosphate | 8.8/9.0 | 1000 | 135 | 40 | 130 | 1.5/4.5 |
| 31 | 0.3 | 0.5 Ca phosphate | 8.6/8.3 | 1100 | 550 | | >110 | 1.5/4.5 |
| 32 | 0.3 | 0.5 Ca phosphate | 8.7/8.2 | 1400 | 350 | | >170 | 1.5/4.5 |
| 33 | | 3 Ca oxalate | 9.0/8.3 | 550 | 225 | 50 | 210 | 1.5/4.5 |
| 34 | | 3 Ca oxalate | 9.0/8.2 | 250 | 60 | | 60 | 1.5/4.5 |
| 35 | | 2 Ca oxalate | 8.7/8.0 | 325 | 40 | | 50 | 1.5/4.5 |

TABLE 5-continued

Rheology of Fluids Containing Zirconate Cleanup Additives, at no shear

| Composition | Breaker (*) | ppt Additive (mesh) | Initial/Final pH | Initial cP | cP @ 100 min | cP @ 240 min | min @ 100 cP | ppt inorganic base/ inorganic buffer |
|---|---|---|---|---|---|---|---|---|
| 36 | | 2 Ca oxalate | 8.7/8.1 | 450 | 25 | | 50 | 1.5/4.5 |
| 37 | | 1 Ca oxalate | 8.8/8.2 | 350 | 275 | 100 | >240 | 1.5/4.5 |
| 38 | | 1 Ca oxalate | 8.8/7.5 | 700 | 400 | 200 | >240 | 1.5/4.5 |
| 39 | | 5 Al metaphosphate | 9.3/7.8 | 550 | 40 | 35 | 60 | 3/4.5 |
| 40 | | 5 Al metaphosphate | 9.3/7.9 | 800 | 40 | 10 | 80 | 3/4.5 |
| 41 | | 2 Al metaphosphate | 8.9/ | 500 | 275 | 150 | >240 | 1.5/4.5 |
| 42 | | 2 Al metaphosphate | 8.9/ | 1000 | 175 | 50 | 150 | 1.5/4.5 |
| 43 | | 1 Al metaphosphate | 8.9/7.5 | 700 | 350 | 90 | 220 | 1.5/4.5 |
| 44 | | 1 Al metaphosphate | 9.0/8.1 | 1000 | 450 | 120 | >240 | 1.5/4.5 |
| 45 | 0.3 | 1 Al metaphosphate | 9.0/7.8 | 1400 | 250 | 50 | 160 | 1.5/4.5 |
| 46 | 0.3 | 1 Al metaphosphate | 9.0/7.9 | 800 | 250 | | 180 | 1.5/4.5 |
| 47 | | 0.5 organophosphate | 9.2/9.2 | 120 | 20 | | 1 | 3/4.5 |
| 48 | | 0.5 organophosphate | 9.2/9.2 | 140 | 20 | | 1 | 3/4.5 |
| 49 | | 0.3 gpt Diethyl Oxalate | 8.4/6.9 | 110 | 35 | 10 | 15 | 1.5/3.5 |
| 50 | | 0.3 gpt Diethyl Oxalate | 8.5/6.9 | 150 | 35 | 20 | 20 | 1.5/3.5 |

(*) The breaker is an inorganic salt, specifically sodium bromate. Blank column indicates gel climbed bob or analysis was prematurely terminated. Composition T is a compound manufactured and sold by Calgon. It is a sodium zinc potassium polyphosphate glass.

The data of Table 5 show that smaller particle size resulted in lower viscosities and faster breaks. Table 5 also provides the viscosities and break rates for various concentrations of various additives. Calcium phosphate and calcium oxalate increased permeability better than Calgon 29L.

For Tables 6A–D, the compositions were prepared with a high temperature zirconate-crosslinked guar at a concentration of 35 pounds of guar per 1000 gallons of fracturing fluid. An aqueous organo-zirconium complex (ZXL-750) in the amount of 0.25 gpt was used to crosslink the guar. All compositions also contained a 0.33 gpt of an inorganic base and a clay stabilizer as an aqueous solution of 2 gpt in deionized water.

Calgon 29L had very little effect on the enhanced viscosity at 250° F. The data show that there may be a slight slowing of the break. Notably, there is little effect of amount (over the narrow range examined) or particle size. Also, addition of the breaker had little effect.

B. 250° F., Sheared in Larsen Mixer 5 min at 1350 sec$^{-1}$

TABLE 6

Rheology of Fluids Containing Zirconate Cleanup Additives
A. 250° F. no shear

| Composition | Breaker (*) | ppt Additive (mesh) | Initial/Final pH | Initial cP | cP @ 100 min | cP @ 240 min | min @ 100 cP | ppt inorganic buffer |
|---|---|---|---|---|---|---|---|---|
| 51 | | | 8.3/7.7 | 400 | 120 | 50 | 120 | 9.6 |
| 52 | | | 8.2/7.8 | 300 | 125 | 50 | 130 | 9.6 |
| 53 | 0.5 | | 8.2/7.8 | 240 | 100 | 20 | 100 | 9.6 |
| 54 | 0.5 | | 8.2/7.8 | 250 | 130 | 40 | 130 | 9.6 |
| 55 | | 0.5 29L (thru 100) | 8.2/7.7 | 200 | 85 | 55 | 75 | 9.6 |
| 56 | | 0.5 29L (thru 100) | 8.3/7.9 | 450 | 100 | 50 | 150 | 9.6 |
| 57 | | 1.0 29L (thru 100) | 8.3/7.8 | 320 | 150 | 75 | 190 | 9.6 |
| 58 | | 1.0 29L (thru 100) | 8.3/7.8 | 375 | 160 | 60 | 170 | 9.6 |
| 59 | | 1.0 29L (270/325) | 8.4/? | 320 | 110 | 60 | 140 | 9.6 |
| 60 | | 0.5 29L (325/400) | 8.5/? | 280 | 120 | 60 | 120 | 9.6 |
| 61 | | 1.0 29L (325/400) | 8.5/? | 340 | 230 | 140 | >240 | 9.6 |
| 62 | | 1.0 29L (325/400) | 8.3/8.0 | 290 | 170 | 100 | 240 | 9.6 |
| 63 | 0.5 | 1.0 29L (325/400) | 8.1/7.5 | 300 | 150 | 80 | 180 | 9.6 |
| 64 | 0.5 | 1.0 29L (325/400) | 8.1/7.6 | 240 | 105 | 55 | 120 | 9.6 |
| 65 | 0.5 | 1.0 29L (thru 400)+ | 8.9/8.2 | 400 | 180 | 25 | 130 | 9.6 |

(*) The breaker is an inorganic salt, specifically sodium bromate; (+) slurried in a paraffinic oil.

| Composition | Breaker (*) | ppt Additive (mesh) | Initial/Final pH | Initial cP | cP @ 100 min | cP @ 240 min | min @ 100 cP | ppt inorganic buffer |
|---|---|---|---|---|---|---|---|---|
| 66 | | | 8.5/7.8 | 165 | 70 | 45 | 45 | 9.6 |
| 67 | | | 8.5/8.3 | 140 | 60 | 35 | 20 | 9.6 |
| 68 | 0.5 | | 8.1/7.6 | 170 | 60 | 20 | 60 | 9.6 |
| 69 | 0.5 | | 8.1/7.9 | 200 | 80 | 35 | 80 | 9.6 |
| 70 | | 0.5 29L (270/325) | 8.6/8.1 | 115 | 45 | 25 | 25 | 9.6 |
| 71 | 0.5 | 0.5 29L (270/325) | 8.2/ | 160 | 60 | 30 | 50 | 9.6 |
| 72 | | 1.0 29L (270/325) | 8.85/8.15 | 250 | 120 | 60 | 170 | 9.6 |
| 73 | | 1.0 29L (270/325) | 8.2/7.6 | 220 | 130 | 80 | 190 | 9.6 |
| 74 | | 0.25 29L (325/400) | 8.6/8.3 | 120 | 70 | 40 | 20 | 9.6 |
| 75 | | 0.25 29L (325/400) | 8.2/8.6 | 100 | 45 | 25 | 3 | 9.6 |
| 76 | | 0.5 29L (325/400) | 8.24/ | 170 | 60 | 30 | 50 | 9.6 |
| 77 | | 0.5 29L (325/400) | 8.1/7.7 | 170 | 125 | 60 | 150 | 9.6 |
| 78 | | 1.0 29L (325/400) | 8.7/8.6 | 140 | 60 | 30 | 40 | 9.6 |
| 79 | | 1.0 29L (325/400) | 8.2/8.5 | 135 | 70 | 40 | 20 | 9.6 |
| 80 | 0.5 | 1.0 29L (325/400) | 8.5/8.4 | 110 | 50 | 10 | 35 | 9.6 |
| 81 | 0.5 | 1.0 29L (325/400) | 8.0/8.2 | 110 | 50 | 25 | 15 | 9.6 |
| 82 | | 3.0 29L (325/400) | 8.2/8.0 | 170 | 105 | 60 | 120 | 9.6 |
| 83 | | 3.0 29L (325/400) | 8.2/8.0 | 165 | 85 | 60 | 50 | 9.6 |

(*) The breaker is an inorganic salt, specifically sodium bromate.

When the compositions were sheared for five (5) minutes in a Larsen mixer at 1350 sec$^{-1}$ before Fann 50 analyses, all the viscosities were lowered. There is still little effect of amount or particle size, but the break may be slightly lower than shown in the compositions of the previous Tables.

C. 220° F., no Shear

| Composition | Breaker | ppt Additive (mesh) | Initial/Final pH | Initial cP | cP @ 100 min | cP @ 240 min | min @ 100 cP | ppt Inorganic buffer |
|---|---|---|---|---|---|---|---|---|
| 84 | | | 8.2/8.4 | 240 | 140 | 115 | >240 | 9.6 |
| 85 | | 1.0 29L (325/400) | 8.4/8.2 | 280 | 155 | 115 | >240 | 9.6 |

D. 220° F., Sheared in Larsen Mixer 5 min at 1350 sec$^{-1}$ (Slip?) indicates that a slip may have occurred during the test, rendering an invalid data point.

For Tables 6E and F, the compositions were prepared with a high temperature zirconate-crosslinked guar at a concentration of 50 pounds of guar per 1000 gallons of fracturing fluid. An aqueous organo-zirconium complex (ZXL-750) in the amount of 0.4 gpt was used to crosslink the guar. All compositions also contained a 0.33 gpt of an inorganic base and a clay stabilizer as an aqueous solution of 2 gpt in deionized water.

| Composition | Breaker | ppt Additive (mesh) | Initial/Final pH | Initial cP | cP @ 100 min | cP @ 240 min | min @ 100 cP | ppt Inorganic buffer |
|---|---|---|---|---|---|---|---|---|
| 86 | | 1.0 29L (325/400) | 8.3/8.0 | 190 | 85 (slip?) | 80 | 90 | 9.6 |
| 87 | | 1.0 29L (325/400) | 8.1/7.6 | 200 | 140 (slip?) | 80 | 140 | 9.6 |
| 88 | | | 8.4/8.2 | 200 | 60 (slip?) | 65 | 25 | 9.6 |
| 89 | | | 8.3/8.4 | 115 | 90 | 65 | 18 | 9.6 |

E. 300° F., no Shear

| Composition | Breaker | ppt Additive (mesh) | Initial/Final pH | Initial cP | cP @ 100 min | cP @ 240 min | min @ 100 cP | ppt Inorganic buffer |
|---|---|---|---|---|---|---|---|---|
| 90 | | 3.0 29L (325/400) | 7.8/77 | 500 | 225 | 100 | 240 | 13.2 |
| 91 | | 3.0 29L (325/400) | adj. to 8.0/7.7 | 600 | 125 | 50 | 120 | 13.2 |
| 92 | | | adj. to 8.0/7.7 | 1000 | 225 | 80 | 190 | 13.2 |

F. 300° F., Sheared in Larsen Mixer 5 min at 1350 sec$^{-1}$

| Composition | Breaker | ppt Additive (mesh) | Initial/Final pH | Initial cP | cP @ 100 min | cP @ 240 min | min @ 100 cP | ppt Inorganic buffer |
|---|---|---|---|---|---|---|---|---|
| 93 | | 3.0 29L (325/400) | adj. to 8.1/7.2 | 400 | 1 | 1 | 10 | 13.2 |
| 94 | | | adj. to 8.2/7.2 | 350 | 1 | 1 | 60 | 13.2 |

At 220° F. and 300° F., the additives again had very little effect on the rheology of the compositions.

For Tables 7A and B, the compositions were prepared with a high temperature zirconate-crosslinked guar at a concentration of 35 pounds of guar per 1000 gallons of fracturing fluid. An aqueous organo-zirconium complex (ZXL-750) in the amount of 0.225 gpt was used to crosslink the guar. The compositions initially contained 0.334 g of polymer and 20/40 mesh Northern White Sand, available from Fairmount Minerals, Chardon, Ohio.

Composition T showed increased polymer recovery, but it was not quite enough to increase the permeability. It is also noteworthy that the breaker alone had very little effect on polymer recovery or permeability retention. Sodium hexametaphosphate had good polymer recovery and better permeability retention.

B. 250° F., no Leakoff, 4 hr Shutin

TABLE 7

Permeability in Runs with Fluids Containing Zirconate Cleanup Additives
A. 250° F., No Leakoff or Shutin

| Composition | Breaker (*) | ppt Additive | Initial pH | g Polymer Retained | % Polymer Recovered | Permeability D | % Permeability Retained |
|---|---|---|---|---|---|---|---|
| 95 | | | | (no polymer) | | 59 | |
| 96 | | | | (no polymer) | | 65 | |
| 97 | 0.3 | | 8.88 | | | 33 | 53 |
| 98 | 0.3 | | 8.81 | | | 32 | 52 |
| 99 | 0.3 | | 8.95 | | | 28 | 45 |
| 100 | 0.3 | | 8.79 | 0.100 | 70 | 41 | 66 |
| 101 | 0.3 | | 8.80 | 0.081 | 76 | 33 | 53 |
| 102 | 0.3 | | 8.58 | 0.133 | 60 | 40 | 65 |
| 103 | 0.3 | 5 Composition T | 8.54 | 0.076 | 77 | 32 | 52 |
| 104 | 0.3 | 5 Composition T | 8.63 | 0.057 | 83 | 29 | 47 |
| 105 | | | 8.66 | 0.105 | 69 | 36 | 58 |
| 106 | | | 8.85 | 0.030 | 91 | 23 | 37 |
| 107 | | | 8.87 | 0.082 | 75 | 36 | 58 |
| 108 | | 5 Na hexametaphosphate | 8.20 | 0.025 | 93 | 40 | 65 |
| 109 | | 6 Na hexametaphosphate | 8.17 | 0.018 | 95 | 44 | 71 |

(*) The breaker is an inorganic salt, specifically sodium bromate.

| Composition | Breaker (*) | ppt Additive (mesh) | Initial pH | g Polymer Retained | % Polymer Recovered | Permeability D | % Permeability Retained |
|---|---|---|---|---|---|---|---|
| 110 | | | 8.87 | 0.058 | 83 | 29 | 47 |
| 111 | | | 8.95 | 0.009 | 97 | 40 | 65 |
| 112 | | | 9.00 | 0.091 | 73 | 25 | 40 |
| 113 | 0.3 | | 8.79 | 0.010 | 97 | 26 | 42 |
| 114 | 0.3 | | 9.11 | 0.017 | 95 | 45 | 73 |
| 115 | 0.3 | 5 Composition T | 8.52 | 0.035 | 90 | 27 | 44 |
| 116 | | 5 Composition T | 8.88 | 0.061 | 82 | 27 | 44 |
| 117 | | 5 29L (thru 100) | 8.84 | 0.050 | 85 | 29 | 47 |
| 118 | | 3 29L (thru 100) | 9.02 | 0.010 | 97 | 34 | 55 |
| 119 | | 0.5 29L (thru 100) | 8.99 | 0.055 | 84 | 31 | 50 |
| 120 | | 0.5 29L (thru 100) | 9.01 | 0.060 | 82 | 31 | 50 |
| 121 | | 0.5 29L (thru 100) | 8.93 | 0.060 | 82 | 47 | 76 |
| 122 | | 0.5 29L (45/70) | 9.02 | 0.025 | 93 | 41 | 66 |
| 123 | | 0.5 29L (70/100) | 9.04 | 0.040 | 88 | 38 | 61 |
| 124 | 0.15 | 0.5 29L (thru 100) | 9.01 | 0.045 | 87 | 32 | 52 |
| 125 | 0.3 | 0.5 29L (thru 100) | 9.05 | 0.057 | 83 | 40 | 65 |
| 126 | | 5 Ca oxalate | 8.77 | 0.041 | 88 | 42 | 68 |
| 127 | | 1 Ca oxalate | 9.08 | 0.033 | 90 | 44 | 71 |
| 128 | | 1 Ca oxalate | 9.02 | 0.069 | 79 | 45 | 73 |
| 129 | | 0.5 Ca oxalate | 9.01 | 0.060 | 82 | 30 | 48 |
| 130 | | 0.5 Ca phosphate | 8.98 | 0.046 | 86 | 45 | 73 |
| 131 | | 1.0 Ca phosphate | 8.73 | 0.035 | 90 | 44 | 71 |
| 132 | | 3 Al metaphosphate | 8.96 | 0.025 | 93 | 27 | 44 |

A shutin time of four (4) hours was used to simulate a representative residence time of an element of injected fluid before it is returned from the subterranean formation. The last fluid injected will experience negligible shutin while the first fluid injected may experience many days in the formation.

Composition T showed no improvement, with or without breaker, as compared to the control compositions. Calgon 29L showed a possible improvement in polymer recovery and a modest improvement in retained permeability. There was little effect of the amount of the additive, which is consistent with the amount in solution being the critical parameter. The particle size also had little effect, but the range examined may have been too narrow. The breaker also had little effect.

Calcium phosphate, calcium oxalate, and sodium hexametaphosphate were equally effective in increasing permeability, but sodium hexametaphosphate prevented gelation. All of them demonstrated better permeability than Calgon 29L.

For Table 8, the compositions were prepared with a high temperature zirconate-crosslinked guar at a concentration of 35 pounds of guar per 1000 gallons of fracturing fluid. An aqueous organo-zirconium complex (ZXL-750) in the amount of 0.25 gpt was used to crosslink the guar. The compositions also contained 9.6 ppt of an inorganic buffer, a clay stabilizer as an aqueous solution of 2 gpt in deionized water, and 20/40 mesh Econoprop, available from Carbo Ceramics, Inc., Irving, Tex. They were analyzed at 250° F.

TABLE 8

Permeability in Runs with Fluids Containing Zirconate Cleanup Additives

| Composition | Breaker | ppt Additive (mesh) | Initial pH | g Polymer Retained | % Polymer Recovered | Permeability D | % Permeability Retained |
|---|---|---|---|---|---|---|---|
| 133 | | | | (no polymer) | | 253 | |
| 134 | | | | (no polymer) | | 261 | |
| 135 | | | 8.18 | 0.005 | 98 | 128 | 50 |
| 136 | | | 8.21 | 0.043 | 86 | 136 | 53 |
| 137 | | | 8.41 | 0.030 | 91 | 150 | 58 |
| 138 | | | 8.88 | 0.067 | 80 | 103 | 40 |
| 139 | | | 8.70 | 0.009 | 97 | 130 | 51 |
| 140 | | | 8.30 | 0.000 | 100 | 103 | 40 |
| 141 | 0.5 | | 8.18 | 0.075 | 78 | 101 | 39 |
| 142 | 1.0 | | 8.68 | 0.058 | 81 | 150 | 58 |
| 143 | 1.0 | | 8.16 | 0.026 | 92 | 125 | 49 |
| 144 | 1.0 | | 8.37 | 0.015 | 95 | 99 | 39 |
| 145 | | 1.0 29L (70/100) | 8.33 | | | 119 | 46 |
| 146 | 1.0 | 1.0 29L (200/270) | 8.68 | 0.064 | 81 | 135 | 53 |
| 147 | | 0.5 29L (thru 100) | 8.06 | 0.034 | 90 | 143 | 56 |
| 148 | | 1.0 29L (thru 100) | 8.13 | 0.039 | 87 | 156 | 61 |
| 149 | | 1.0 29L (thru 100) | 8.23 | | | 153 | 60 |
| 150 | 0.5 | 0.5 29L (thru 100) | 8.13 | 0.000 | 100 | 129 | 50 |

TABLE 8-continued

Permeability in Runs with Fluids Containing Zirconate Cleanup Additives

| Composition | Breaker | ppt Additive (mesh) | Initial pH | g Polymer Retained | % Polymer Recovered | Permeability D | % Permeability Retained |
|---|---|---|---|---|---|---|---|
| 151 | | 1.0 29L (thru 400) | 8.62 | 0.013 | 96 | 127 | 49 |
| 152 | 1.0 | 1.0 29L (thru 400) | 8.64 | 0.035 | 90 | 142 | 55 |
| 153 | 1.0 | 1.0 29L (thru 400) | 8.83 | 0.039 | 88 | 170 | 66 |
| 154 | | 1.0 29L (325/400) | 8.30 | 0.031 | 91 | 133 | 52 |
| 155 | | 1.0 29L (325/400) | 8.18 | 0.096 | 76 | 134 | 52 |
| 156 | | 1.0 29L (325/400) | 8.32 | 0.062 | 81 | 132 | 51 |
| 157 | | 1.0 29L (325/400) | 8.42 | 0.000 | 100 | 136 | 53 |
| 158 | | 1.0 29L (325/400) | 8.39 | 0.063 | 82 | 103 | 40 |
| 159 | | 1.0 29L (325/400) | 8.21 | | 88 | 107 | 42 |
| 160 | | 1.0 29L (325/400) | 8.47 | 0.000 | 100 | 128 | 50 |
| 161 | | 1.0 29L (325/400) | 8.27 | 0.022 | 93 | 118 | 46 |
| 162 | | 1.0 29L (325/400) | 8.23 | 0.048 | 86 | 147 | 57 |
| 163 | | 1.0 29L (325/400) | 8.41 | | 93 | 211 | 82 |
| 164 | | 1.0 29L (325/400) | 8.30 | 0.044 | 86 | 162 | 63 |

(*) The breaker is an inorganic salt, specifically sodium bromate.

Table 8 shows that in conductivity experiments with a proppant pack 20/40 mesh Econoprop without additive and with or without breaker, there was an average of about 90% polymer recovered and 49% permeability retained. With Calgon 29L without breaker, the results were about the same. But, with breaker, the polymer recovered stayed about the same while the average permeability retention was 62%—an improvement of approximately 25%.

As the examples show, several compounds were evaluated to determine whether they released a species that would be a good chelant for the zirconate crosslinker. The examples show that the rheology of the zirconate-crosslinked polymers was affected as follows:

| Prevented Gelation | Premature Break | Satisfactory Gelation and Break Time |
|---|---|---|
| sodium hexametaphosphate | diethyl oxalate | calcium phosphate |
| sodium pyrophosphate | | calcium oxalate |
| | | aluminum metaphosphate |
| | | Composition T, sodium zinc potassium polyphosphate glass |
| | | Calgon 29L, sodium calcium magnesium polyphosphate glass |

The aforementioned compounds which prevented gellation dissolve too quickly. Such compounds may be made into suitable compounds for releasing chelating agents by encapsulating an effective amount of such compounds in a material that dissolves or is crushed after the fracturing operation is completed. See U.S. Pat. Nos. 5,497,830 and 5,624,886, incorporated herein by reference. The chelating agent would then disrupt the polyvalent metal crosslinks in the crosslinked polymer and bind with the resulting polyvalent metal ion. The encapsulating material and process for doing so would be similar to that used with conventional encapsulated breakers. But, rather than degrading the polymer itself, the chelating agent would break the polyvalent metal crosslink and bind with the removed polyvalent metal ion.

The embodiments described herein are given to illustrate the scope and spirit of the present invention. The embodiments herein will make apparent to those skilled in the art other embodiments which may also be used. These other embodiments are within the scope of the present invention. Thus, the scope of the invention should be determined by the appended claims and their legal equivalents, rather than by the embodiments given herein.

What is claimed is:

1. A composition for hydraulically fracturing a subterranean formation comprising:

a. an aqueous mixture of a hydrated polysaccharide, the hydrated polysaccharide having a plurality of bonding sites;

b. a crosslinking agent for crosslinking the hydrated polysaccharide at the bonding sites at the conditions of the subterranean formation, with a polyvalent metal ion to form a polyvalent metal crosslink, thereby increasing the viscosity of the hydrated polysaccharide; and c. a controlled solubility compound for releasing a chelating agent for controllably breaking the polyvalent metal crosslink and bonding with the polyvalent metal ion resulting from breaking the crosslink, thereby decreasing the viscosity of the hydrated polysaccharide;

wherein the controlled solubility compound is selected from the group consisting of calcium oxalate, calcium phosphate, aluminum metaphosphate, sodium zinc potassium polyphosphate glass, and sodium calcium magnesium polyphosphate glass.

2. A composition for hydraulically fracturing a subterranean formation comprising:

a. a crosslinked polysaccharide, having polyvalent metal crosslinks; and b. a controlled solubility compound for releasing a chelating agent for controllably breaking the polyvalent metal crosslink and bonding with the polyvalent metal ion resulting from breaking the crosslink, thereby decreasing the viscosity of the polysaccharide;

wherein the return of the polysaccharide is increased; and wherein the controlled solubility compound is selected from the group consisting of calcium oxalate, calcium phosphate, aluminum metaphosphate, sodium zinc potassium polyphosphate glass, and sodium calcium magnesium polyphosphate glass.

3. A method of fracturing a subterranean formation comprising the steps of:

a. injecting a composition into the subterranean formation, said composition comprising:
   an aqueous mixture of a hydrated polysaccharide, the hydrated polysaccharide having a plurality of bonding sites,
   a crosslinking agent for crosslinking the hydrated polysaccharide at the bonding sites at the conditions of the subterranean formation, with a polyvalent metal ion to form a polyvalent metal crosslink, thereby increasing the viscosity of the hydrated polysaccharide, and
   a controlled solubility compound for releasing a chelating agent for controllably breaking the polyvalent metal crosslink and bonding with the polyyalent metal ion resulting from breaking the crosslink, thereby decreasing the viscosity of the hydrated polysaccharide;
b. allowing the controlled solubility compound to begin breaking the polyvalent metal crosslink, thereby reducing the viscosity of the hydrated polysaccharide and yielding a lower viscosity fluid; and
c. removing the lower viscosity fluid;
wherein the controlled solubility compound is selected from the group consisting of calcium oxalate, calcium phosphate, aluminum metaphosphate, sodium zinc potassium polyphosphate glass, and sodium calcium magnesium polyphosphate glass.

4. A method of fracturing a subterranean formation comprising the steps of:
a. providing a fracturing fluid formed from a crosslinked polysaccharide, having polyvalent metal crosslinks, and a controlled solubility compound for releasing a chelating agent for controllably breaking the polyyalent metal crosslinks and bonding with the polyvalent metal ion resulting from breaking the crosslink;
b. injecting the fracturing fluid into the subterranean formation;
c. allowing the controlled solubility compound to begin breaking the polyvalent metal crosslink, thereby reducing the viscosity of the hydrated polysaccharide and yielding a lower viscosity fluid; and
d. removing the lower viscosity fluid;

wherein the controlled solubility compound is selected from the group consisting of calcium oxalate, calcium phosphate, aluminum metaphosphate, sodium zinc potassium polyphosphate glass, and sodium calcium magnesium polyphosphate glass.

5. A method of selectively predetermining the elapsed time prior to activating the breaking of a viscous gel to conform to variables in a particular fracturing event, comprising:
a. selecting a composition based on the variables for the particular fracturing event, said composition comprising:
   an aqueous mixture of a hydrated polysaccharide, the hydrated polysaccharide having a plurality of bonding sites,
   a crosslinking agent for crosslinking the hydrated polysaccharide at the bonding sites at the conditions of the subterranean formation, with a polyvalent metal ion to form a polyvalent metal crosslink, thereby increasing the viscosity of the hydrated polysaccharide, and
   a controlled solubility compound for releasing a chelating agent for controllably breaking the polyvalent metal crosslink and bonding with the polyvalent metal ion resulting from breaking the crosslink, thereby decreasing the viscosity of the hydrated polysaccharide;
b. injecting the composition into a subterranean formation;
c. reacting the hydrated polysaccharide with the crosslinking agent to form a viscous gel;
d. hydraulically fracturing the subterranean formation; and
e. chelating the crosslinking agent with the chelating agent to break the viscous gel;
wherein the controlled solubility compound is selected from the group consisting of calcium oxalate, calcium phosphate, aluminum metaphosphate, sodium zinc potassium polyphosphate glass, and sodium calcium magnesium polyphosphate glass.

* * * * *